United States Patent
Deng et al.

(10) Patent No.: US 7,267,494 B2
(45) Date of Patent: Sep. 11, 2007

(54) FIBER STUB FOR CLADDING MODE COUPLING REDUCTION

(75) Inventors: Hongyu Deng, Saratoga, CA (US);
Yuri Vandyshev, San Jose, CA (US);
Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/345,069

(22) Filed: Jan. 31, 2006

(65) Prior Publication Data

US 2006/0171631 A1    Aug. 3, 2006

Related U.S. Application Data

(60) Provisional application No. 60/649,204, filed on Feb. 1, 2005.

(51) Int. Cl.
*G02B 6/26* (2006.01)
*G02B 6/36* (2006.01)
*G02B 6/42* (2006.01)

(52) U.S. Cl. ............. 385/92; 385/27; 385/28; 385/33; 385/39; 385/55; 385/88

(58) Field of Classification Search ............ 385/27–28, 385/33, 39, 55, 60, 76–78, 88, 92
See application file for complete search history.

(56) References Cited

U.S. PATENT DOCUMENTS

| | | | |
|---|---|---|---|
| 4,805,976 A | * | 2/1989 | Wilkening et al. ............ 385/84 |
| 6,944,381 B2 | * | 9/2005 | Kurusu et al. ............... 385/123 |
| 2004/0264866 A1 | * | 12/2004 | Sherrer et al. ................ 385/49 |

OTHER PUBLICATIONS

IEEE Draft P802.3aq™/D3.0. *Part 3: Carrier Sense Multiple Access with Collision Detection (CSMA/CD) Access Method and Physical Layer Specifications. Amendment: Physical Layer and Management Parameters for 10 Gb/s Operation. Type 10GBASE-LRM.* LAN/MAN Standards Committee of the IEEE Computer Society, 50 pages. (Nov. 2005).

* cited by examiner

*Primary Examiner*—Frank G. Font
*Assistant Examiner*—Michael P. Mooney
(74) *Attorney, Agent, or Firm*—Workman Nydegger

(57) ABSTRACT

Fiber stub interface for reducing cladding mode light. The fiber stub can be implemented in an optical transmission device. The optical transmission device can be a transceiver that also includes an optical signal receiver. The fiber stub includes an optical fiber and a ferrule. The optical fiber includes both a core and a cladding. The ferrule includes a glass material with a refractive index that is greater than the refractive index of at least a portion of the optical fiber. As a result, the cladding modes are refracted into the ferrule and away from the core, thereby reducing the chance that they are transmitted to an external optical fiber. An absorptive layer can be applied to an outer surface of the ferrule to absorb the refracted cladding modes.

23 Claims, 2 Drawing Sheets

FIBER STUB FOR CLADDING MODE COUPLING REDUCTION

CROSS-REFERENCE TO RELATED APPLICATIONS

This application claims the benefit of U.S. Provisional Patent Application No. 60/649,204, filed Feb. 1, 2005, which is incorporated herein by reference in its entirety.

BACKGROUND

1. The Field of the Invention

The present invention relates generally to the field of fiber optic communication. More particularly, the present invention relates to an optical fiber stub having a fiber within a ferrule, wherein the ferrule has an index of refraction higher than that of at least a portion of the fiber core.

2. Related Technology

Communications networks continue to develop and expand due to declining costs, improved performance of computer and networking equipment, and growth of the Internet. One type of communication network of increased importance is fiber optic communications networks. Fiber optic communications networks include communications systems and components in which optical fibers are used to carry signals form point to point. Optical fibers for carrying such signals include filaments or fibers made of dielectric materials that guide light.

A small core optical fiber, for example about 8-9 microns, typically carries a single-mode and is therefore termed single-mode fiber. Such single-mode fibers are well suited for long transmission distances because all of the light travels within the fiber along a well defined trajectory. A larger core diameter fiber, for example 62.5 microns, can propagate more than one mode of light and is therefore termed a multi-mode fiber. Multi-mode fiber is well suited to shorter transmission distances, for example within buildings, while single-mode fiber is well suited to longer transmission distances such as long-distance telephony and cable television systems.

Single-mode fibers have several advantages over multi-mode fibers. For example, single-mode fibers allow for a higher bandwidth-distance capacity to transmit information because they retain the fidelity of each light pulse over longer distances. Single-mode fibers also do not exhibit modal dispersion caused by differences between tolerances needed to make fiber optic connectors and the corresponding receptacles on fiber optic transceivers. However, single-mode fibers have been expensive, which has made them impractical for cost sensitive short distance data links.

For these reasons, multi-mode fibers became, and to a large extent remain, the practical standard for fiber optic cabling within short distance applications, such as local area networks within office buildings and the like. This has led to a large infrastructure of legacy multi-mode fiber and a corresponding desire to use this infrastructure for newer higher speed links. As a result, as well as for other reasons, many fiber optics transceivers are required to work with both single-mode and multi-mode fibers.

To communicate over a network using fiber optic technology, fiber optic components such as fiber optic transceivers are used to send and receive optical data signals. Generally, a fiber optic transceiver can include one or more optical subassemblies ("OSA") such as a transmitter optical subassembly ("TOSA") for sending optical signals, and a receiver optical subassembly ("ROSA") for receiving optical data signals. Both the ROSA and the TOSA include specific optical components for performing such functions. In particular, a typical TOSA includes an optical transmitter, such as a laser, for sending an optical signal. Many different types of lasers are known to those skilled in the art. For example, there are edge emitting lasers, such as double heterostructure, quantum well, strained layer, distributed feedback, and distributed Bragg reflector lasers. Another type of laser referred to as a vertical cavity surface emitting laser ("VCSEL") emits light in a single direction through an upper surface of the laser structure.

As described above, many fiber optic transceivers are required to work with both single-mode and multi-mode fibers. Because the core of single-mode fibers is relatively small, typically around 9 microns, light coupling to a single-mode fiber can be challenging. Multi-mode fibers, on the other hand, have relatively large diameters, typically 50 or 62.5 microns. Thus, because multi-mode fibers have a diameter that is on the order of six times greater than that of single-mode fibers there is about a 30 to 35 time larger core area for multi-mode fibers to receive light than that for single-mode-fibers. As a result, multi-mode fibers tend to couple significantly more light than single-mode fibers from the same light source.

There are relatively tight industry standards for coupling optical power into optical fibers. Therefore, controlling optical power coupling for both single-mode and multi-mode fibers can present problems for transceiver design. Because of the small diameter of single-mode fibers, single-mode fibers project well focused light in a certain area of the multi-mode fiber for optimal link performance. One example of a requirement for projection of light between optical fibers is the IEEE 802.3aq standard, which specifies that the light is to be focused to the center 10 microns of the multi-mode fibers. Too much light outside of the 10 micron diameter, but still within the 50 micron or 62.5 micron diameter of the multi-mode fiber, seriously degrades the 300 meter multi-mode legacy fiber link performance, due to fiber manufacturing imperfections.

One attempt at resolving this problem involves the use of a short single-mode fiber stub at the end of the transceiver light source. Light is focused onto the core of a single-mode fiber within the fiber stub. The fiber stub mates with an external fiber, and ideally, if the light is confined well within the core, all of the light is coupled into the center of a core of the external fiber. This should be true whether or not the external fiber is a single-mode fiber, or multi-mode fiber.

Unfortunately, this approach does not work well because the length of the fiber stub is limited to a few millimeters in conventional transceivers. Depending on considerations such as the laser beam profile, lens design, and alignment tolerances, centering the focal spot of the light entering the core of the fiber stub can be complicated. Where misalignment occurs, a significant portion of the light is coupled into the cladding of the fiber stub. This light can also be referred to as cladding modes, and the cladding modes are reflected off the walls of the ferrule in which the stub is positioned. If the fiber is relatively long, the cladding modes tend to die out by the time the light reaches the opposite end of the fiber. In this instance, only light in the fiber core is propagated out to the external optical fiber. In the case of a short fiber stub, however, much of the light in the cladding survives, and a portion of that light may be coupled into the endface of the external multi-mode fiber core by reflecting off cladding walls of the fiber stub and being received within the multi-mode core of the external optical fiber.

The optical power transmitted through the fiber stub cladding and coupled into the core of the external multi-mode fiber represents the coupling difference between external single-mode and multi-mode fibers and can range from 1 dB up to 5-6/dB, depending on the laser focal spot beam quality. Thus, what would be advantageous is to reduce, or eliminate, the transfer of cladding modes of light between optical fibers.

BRIEF SUMMARY OF SEVERAL EXAMPLE EMBODIMENTS

Embodiments disclosed herein relate to improving signal integrity when signals are transferred from one fiber to another. A fiber stub is disclosed, the fiber stub includes a ferrule and an optical fiber positioned within the ferrule. The optical fiber includes a core and a cladding, the cladding having a refractive index that is less than or substantially equal to a refractive index of the ferrule.

An optical device is disclosed. The optical device includes a laser, lens, and a fiber stub. The lens couples light transmitted from the laser into the fiber stub. The fiber stub includes a ferrule including a glass material and a glass fiber positioned within the ferrule. The glass material of the ferrule has a refractive index that is greater than the refractive index of at least a portion of the glass fiber.

An optical transceiver is disclosed. The optical transceiver includes a receiver optical subassembly and a transmitter optical subassembly. The transmitter optical subassembly includes a laser, a lens, and a single-mode fiber stub. The lens couples light from the laser into the fiber stub. The single-mode fiber stub includes a ferrule formed from a glass material and a glass fiber positioned within the ferrule. The glass fiber includes a cladding and a core. The glass material of the ferrule has a refractive index that is greater than the refractive index of the glass fiber These and other aspects will become more fully apparent from the following description and appended claims.

BRIEF DESCRIPTION OF THE DRAWINGS

To further clarify the above and other advantages and features of the present invention, a more particular description of the invention will be rendered by reference to example embodiments thereof which are illustrated in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale.

Embodiments illustrated herein relate to improving optical signal integrity when transferring an optical signal from one optical fiber to a second optical fiber. Such embodiments can be implemented in various fiber optical components and optical subassemblies. Transceivers, for example, transmit optical signals to external optical fibers and receive optical signals from external optical fibers for transmission of optical signal from point to point within optical networks. External optical fibers may be of various types.

Embodiments set forth herein can be implemented in systems transferring data at several gigabytes per second, or more, for example. For example, these embodiments, as well as others, can support at least 10 Gb/s data rates through at least as much as 300 meters of legacy fiber using light sources, such as lasers, which can transmit light at wavelengths of about 1310 nanometers, for example. The light source can be any kind of optical transmitter, such as a laser. For example, the transmitter can be a VCSEL operating at a wavelength between 850 and 1500 nanometers or an edge emitting laser operating at various wavelengths. Other types of lasers and operation wavelengths can also be employed, and the scope of the invention is not limited to the example optical transmitters and wavelengths disclosed herein.

Figure 1:
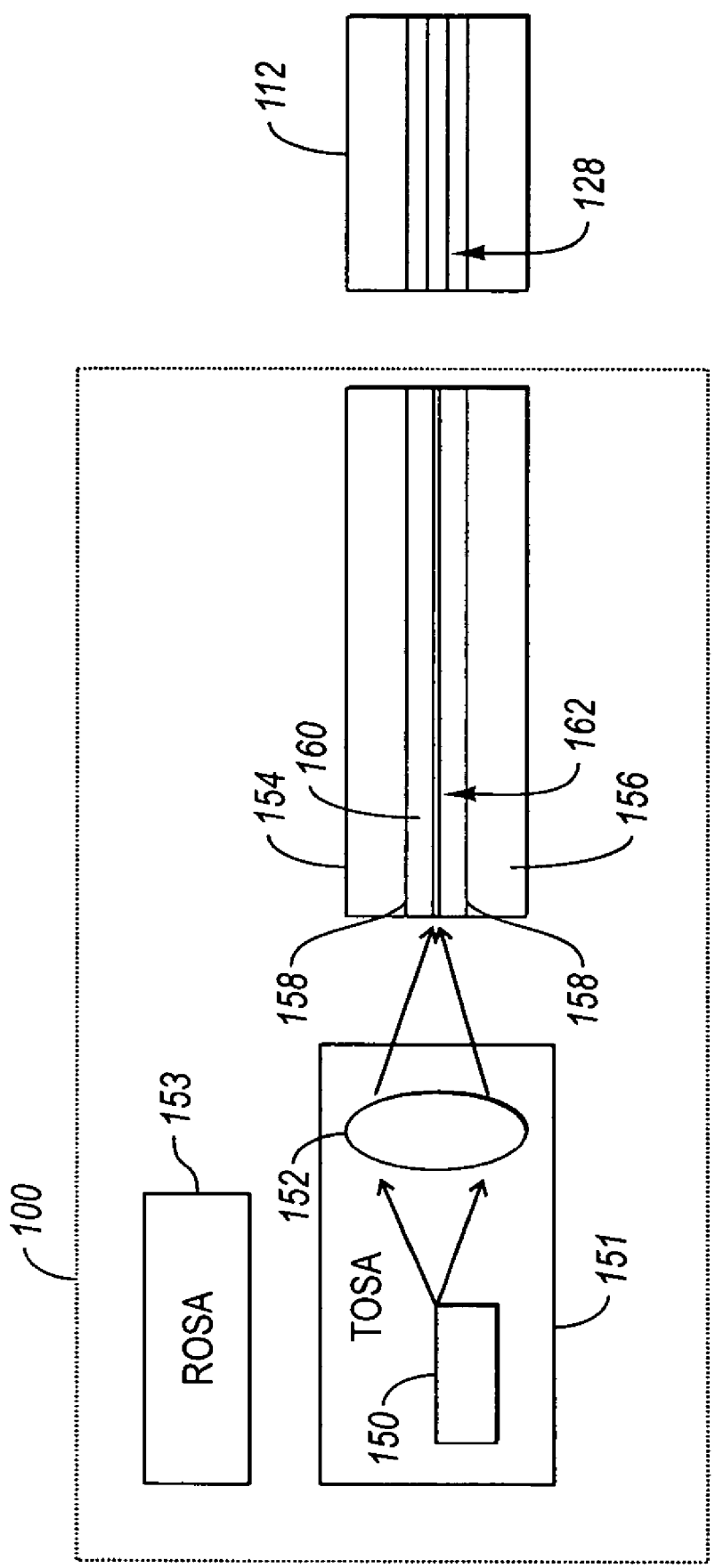
FIG. 1 illustrates a transceiver according to an example embodiment.

Referring to FIG. 1, a transceiver 100 embodiment is used to communicate an optical signal to a multi-mode fiber 112. The transceiver 100 can include a ROSA 153 and a TOSA 151. The TOSA 151 is illustrated to include a light source 150, such as a laser, and a lens 152, but it will of course be understood to those skilled in the art, in view of the disclosure herein, that the transceiver 100 can include a wide variety of devices in any of a number of configurations. Light is divergently emitted by the light source 150 and is coupled into fiber stub 154 by lens 152. Lens 152 can be located within TOSA 151, or external to TOSA 151. Fiber stub 154 includes a ferrule 156, a cladding 160, and a core 162. In this example, the light is substantially coupled into the center of the core 162.

As the light exits the transceiver 100, the light is coupled into the adjacent external multi-mode fiber 112. Again, it will be understood, in view of the disclosure herein, that the nature of the mating and the various types of interfaces between transceiver 100 and multi-mode fiber 12 is device dependent and various such configurations fall within the scope of the present invention.

In one example embodiment, the ferrule 156 of the fiber stub 154 is at least partially made of glass. According to the embodiment illustrated in FIG. 1, the ferrule 156 and an epoxy used to glue the ferrule 156 to the cladding 160, each have a higher optical index than the cladding 160. This relationship of indices reduces the amount of light that is coupled into the core 128 of the external multi-mode fiber 112 through the fiber stub cladding 160.

In addition to having the ferrule index being larger than that of the cladding, another effective way of stripping off the cladding mode is to have the ferrule index being substantially equal to that of the cladding, for example within an index of refraction of 0.1 of that of the cladding. When the index difference is less than 0.1, for example, the index discontinuity at the interface will small and hence the reflection is minimized as well.

The transceiver 100 illustrated in FIG. 1 can support data rates as high as 10 Gb/s data higher through as much as 300 meters or more of legacy fiber using the light source 150. The light source 150 can transmit light at wavelengths of up to about 1310 nanometers or more, for example. For example, the light source 150 can be a VCSEL operating at a wavelength between 850 and 1500 nanometers or an edge emitting laser operating at various wavelengths. Other types of lasers and operational wavelengths can also be employed, and the scope of the invention is not limited to the example light source 150 and wavelengths disclosed herein. For example, the transceiver 100 can be a 10GBASE-LRM module that supports 10 Gb/s 1310 nm transmission through about 300 meters of legacy multi-mode fiber.

Figure 2:
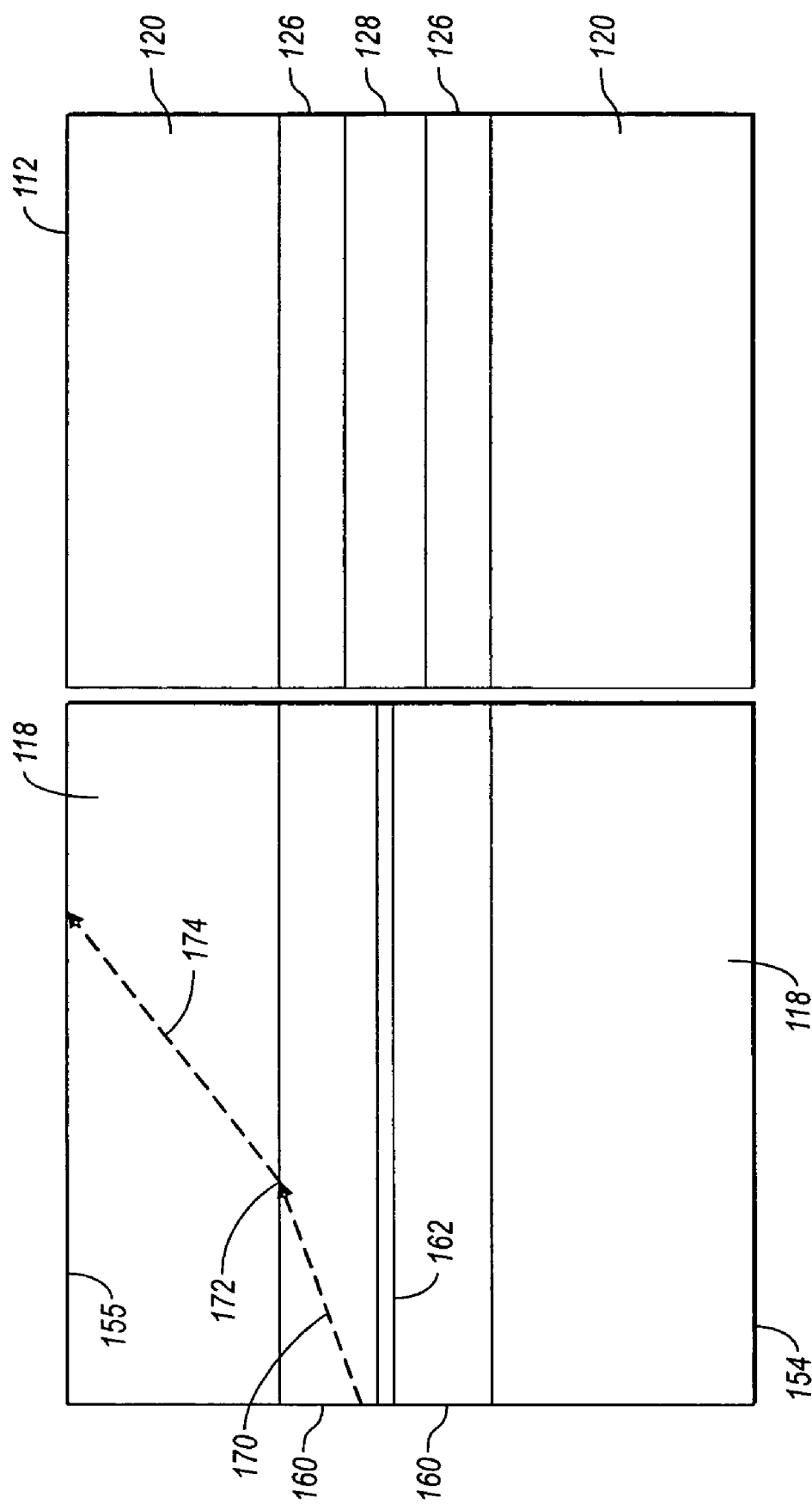
FIG. 2 illustrates a single-mode to multi-mode transition according to an example embodiment.

Referring to FIG. 2, a partial cross-sectional view of the interface between the fiber stub 154 and the external optical fiber 112 is illustrated. The external optical fiber 112 includes a core 128, cladding 126, and a ferrule 120. In operation, light 170 received by the cladding 160 and reaching a cladding-to-ferrule interface 172 tends to refract into the ferrule 118 as refracted light 174 in FIG. 1 and away from the fiber core 162 because of the refractive index difference between the cladding 160 and the ferrule 118. As a result of this configuration, the refracted light 174 is directed away from the center of fiber stub 154 thereby reducing the likelihood that the undesirable cladding modes, denoted as light 170 will be coupled into the core 128 of the external fiber 112.

Various additional embodiments are enabled in view of the present disclosure. For example, an absorptive layer can be applied to the outside diameter surface 155 of the glass ferrule 118. One type of absorptive layer is a black coating, which can be applied to the perimeter of the outside surface 155 of the ferrule 118 to absorb and further reduce the cladding mode light. In this manner, cladding modes can be more quickly dissipated such that there is less chance that these modes are coupled into the core 128 of the external optical fiber 112. Where the fiber stub 154 is implemented in the transceiver 100 illustrated in FIG. 1, fiber stub 154 may have a length of a few millimeters, for example less than five millimeters while reducing transmission of cladding modes into the external optical fiber 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fiber stub comprising:
   a ferrule; and
   an optical fiber positioned within the ferrule, the optical fiber including a core and a cladding, the cladding having a refractive index that is less than a refractive index of the ferrule.

2. A fiber stub as defined in claim 1, wherein the ferrule is at least partially made of a glass material.

3. A fiber stub as defined in claim 1, wherein the optical fiber is at least partially made of a glass material.

4. A fiber stub as defined in claim 1, wherein the fiber stub has a length of less than about five millimeters.

5. A fiber stub as defined in claim 1, wherein the ferrule further includes an absorbing layer on an outer surface of the ferrule.

6. A fiber stub as defined in claim 1, the ferrule includes a black colored layer.

7. A fiber stub as defined in claim 1, wherein the optical fiber is a single-mode fiber.

8. A fiber stub as defined in claim 1, wherein the fiber includes a single-mode core encased within a cladding, the refractive index of the ferrule is greater than the refractive index of the cladding, and the refractive index of the core being greater than the refractive index of the cladding.

9. A fiber stub as defined in claim 1, wherein the core has a diameter of less than about 10 micrometers.

10. A fiber stub as defined in claim 1, wherein the fiber stub is configured to couple light from a core of the fiber with both a single-mode external fiber and a multi-mode external fiber.

11. A fiber stub as defined in claim 1, wherein the index of refraction of the cladding is within 0.1 of the index of refraction of the ferrule.

12. An optical device comprising:
    a laser;
    a fiber stub comprising:
        a ferrule including a glass material; and
        a glass fiber positioned within the ferrule, the glass material of the ferrule having a refractive index that is greater than the refractive index of at least a portion of the glass fiber; and
    a lens that couples light transmitted emitted by the laser into the fiber stub.

13. An optical device as defined in claim 12, wherein the glass fiber comprises a single-mode fiber.

14. An optical device as defined in claim 12, wherein the fiber stub has a length of less than about five millimeters.

15. An optical device as defined in claim 12, wherein the laser transmits light at a wavelength of about 1310 nanometers.

16. An optical device as defined in claim 12, wherein the optical device is a transmit optical subassembly.

17. An optical device as defined in claim 12, wherein the glass fiber includes a cladding and a core, wherein the core has a diameter of less than about 10 microns.

18. An optical transceiver comprising:
    a receiver optical subassembly; and
    a transmitter optical subassembly comprising:
        a laser; and
        a single-mode fiber stub including:
            a ferrule comprising a glass material; and
            a glass fiber positioned within the ferrule, the glass fiber including a cladding and a core, the glass material of the ferrule has a refractive index that is greater than the refractive index of the glass fiber; and
        a lens that couples light emitted by the laser into the fiber stub.

19. An optical transceiver as defined in claim 18, wherein the core has a diameter of less than about 10 microns and the fiber stub has a length of less than about 5 microns.

20. An optical transceiver as defined in claim 18, wherein the transceiver is a 10GBASE-LRM module configured to transmit data at a rate of about 10 gigabits per second, the laser transmits light at a wavelength of 1310 nanometers, and the transceiver is configured to transmit signals across at least 300 meters of fiber.

21. An optical transceiver as defined in claim 18, wherein the single-mode fiber stub is configured to optically couple with both a single-mode and a multi-mode external optical fiber.

22. An optical transceiver as defined in claim 18, wherein the index difference between the cladding and the ferrule is less than 0.1.

23. A fiber stub as defined in claim 1, wherein the ferrule has a unlace that directly interfaces with a surface of the cladding.

* * * * *